June 1, 1937.  A. GUERRIERO  2,082,332
PISTON RING SPRING
Filed Oct. 20, 1936
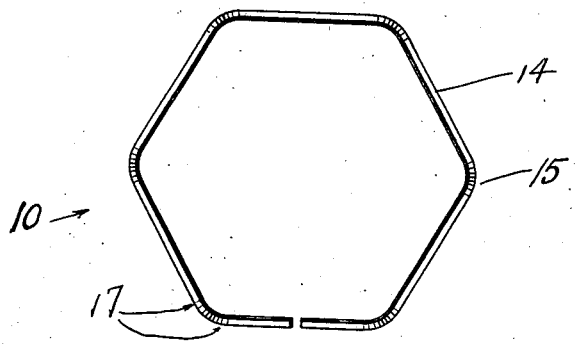
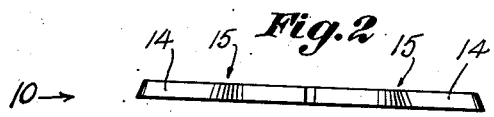
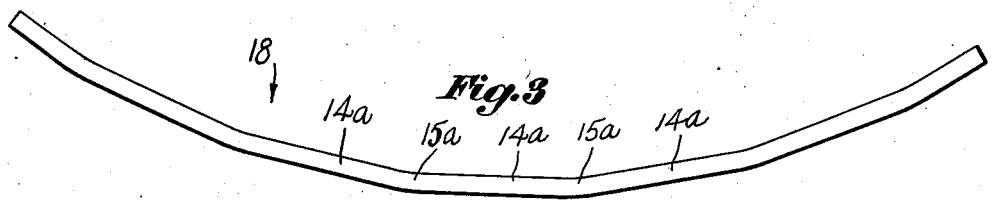
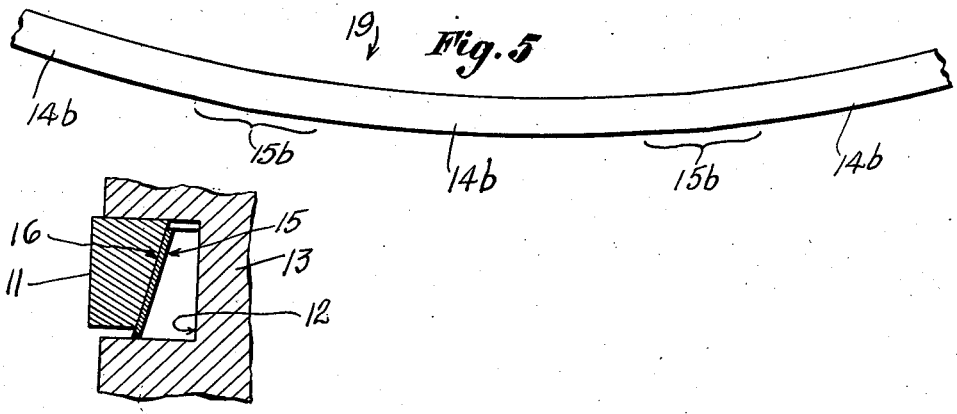
INVENTOR.
Anthony Guerriero
BY
ATTORNEY.

Patented June 1, 1937

2,082,332

UNITED STATES PATENT OFFICE 2,082,332

PISTON RING SPRING

Anthony Guerriero, Brooklyn, N. Y.

Application October 20, 1936, Serial No. 106,512

8 Claims. (Cl. 309—43)

This invention relates to piston ring springs.

One object of the invention is to provide a spring adapted to expand and to cause axial movement of a piston ring and to be adapted for assembling in the rather small space available in the piston groove and without requiring that the piston ring shall be reduced in thickness to afford the requisite space for the spring.

Heretofore springs for the above purpose have been known, and have been provided with various cuts or projections which seriously weakened the spring and set up areas unduly subject to the destructive effects of vibration. Other springs for a like purpose have been provided with bends to afford outwardly offset cam portions, with the result that it was impossible to insert such springs, without excessively cutting down on the thickness of the ring to provide more space, the piston ring being weakened as a consequence and affording too little seating area to permit the ring to act as an oil seal. The spring in question required more space for the reason that it was almost impossible to sufficiently flatten the bent cam portions on assembling the spring in the piston.

The present invention aims to overcome these drawbacks in a simple, reliable and inexpensive manner.

Other objects and advantages of the invention will become apparent as the specification proceeds.

With the aforesaid object in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a plan view of a piston ring spring embodying the invention.

Fig. 2 is a view in elevation thereof.

Fig. 3 is a blank from which the spring may be directly formed.

Fig. 4 is a fragmentary sectional view of the spring as assembled in a piston and bearing on the ring.

Fig. 5 is a fragmentary diagrammatic exaggerated view showing a configuration of a blank for the spring.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a piston ring expander or spring adapted to expand and cause axial movement of a piston ring 11 in the usual groove 12 of a piston 13, to thus afford a satisfactory oil seal. The assembling of the parts relative to each other and the cylinder is conventional.

The spring 10 is of polygonal shape, having relatively straight side portions 14 and curved corner portions 15, the latter thus bearing evenly on the ring 11, while the former bear on the inner wall of the groove 12. To cause the axial movement of the ring, the latter has an inner inclined or cam surface 16, the corner portions 15 being correspondingly inclined. The side portions 14 are of the full width of the corner portions so that the strength of the spring is maintained against the effects of vibration. To avoid the use of any relatively sharp bends, the side portions 14 are inclined in the same generally axial direction as the corner portions, and thus merge into the latter tangentially at all points as indicated at 17.

The spring 10 may be made of a generally curved blank of relatively resilient metal 18. Desirably the latter is formed so as to provide relatively straight sections 14a and slightly curved corner sections 15a, corresponding respectively to the side and corner portions 14, 15. The blank 18 may be made of a straight strip of material, suitably bent at 15a to produce the blank 18, which lies in a plane. The general curvature of the blank 18 is somewhat exaggerated to more clearly show the construction. If now the blank 18 is bent at its corners 15a, the spring 10 is directly produced. The bends at 15a may be made on a cylindrical form or on a conical form upwardly or downwardly tapered as may be desired, the important thing being that the corner portions 15 shall be curved, and the side portions 14 shall smoothly merge thereinto.

If desired, the blank 18 may be regarded as formed along a true arc of a circle, without providing the straight sides 14a, and a spring such as 10 may be directly produced therefrom in the manner above described. However, it may be preferred to use a plane blank as shown at 19, wherein the side portions 14b are slightly curved or arc-shaped, the corner portions 15b being arc-shaped according to a smaller radius than that of the side portions 14b, and the edges of the latter merging tangentially into the edges of the corner portions 15b. Hence the corner portions 15b project slightly beyond the side portions 14b. The blank 19 may be directly formed into a spring such as 10 in the manner above set forth. The advantage in using the blank 19 is that the lower edge of the spring will uniformly seat at all points on the lower face of the groove 12, it being borne in mind that the polygonal spring 10 becomes generally quite circular when assembled in the piston. If straight side portions 14a are used, the latter will become slightly elevated above the lower groove face; if the blank be a true arc, the corner portions of the spring will become slightly elevated above the groove face; such results may be desirable to permit oil to freely enter the groove 12, but in general it is preferred to use a blank such as 19. Since the curvature of the side portions 14b is very slight, the blank 18 may be regarded as a substantial representation of the blank 19.

In standard motors of automobiles, the radial depth of the groove 12 varies between 9/64 and 5/32 of an inch. The radial thickness of the ring 11 is usually such as to leave a mean radial space of 1/16 of an inch for the spring 10. This small space must accommodate the thickness of the spring 10, and hence very little room is available for distortion of the spring to fit. With previous springs, in which sharp bends were provided to afford axially acting cam portions it was extremely difficult to distort the spring so as to force it in place. If sufficiently distorted, such spring would loose its cam portion; but if the metal was sufficiently stiff, the spring would act as a rigid, non resilient member at the corner portions due to the sharp bends. All these defects are overcome by my invention, which permits the corner portions to suitably flatten upon assembling, and to maintain their operative resilience. Also my spring is wholly uniform throughout so that breakage or cracking at cuts or cam tongues is avoided.

It will be appreciated that various changes and modifications may be made in the device as shown in the drawing, and that the same is submitted in an illustrative and not in a limiting sense, the scope of the invention being defined in the following claims.

I claim:

1. A piston ring spring adapted to expand and axially move a piston ring, including a strip of resilient material of polygonal form having side and corner portions correspondingly inclined to the axis of the spring, said corner portions being curved and the side portions tangentially merging into the corner portions.

2. A piston ring spring adapted to expand and cause axial movement of a piston ring, said spring being of the general shape of a frustum of a regular pyramid.

3. A piston ring spring adapted to expand and cause axial movement of a piston ring, said spring being of the general shape of a frustum of a regular pyramid, the corner portions of said spring being curved and merging gradually into the sides thereof.

4. A piston ring spring adapted to expand and cause axial movement of a piston ring, including a strip of resilient metal of polygonal form, the lower periphery of said spring being greater in length than the upper periphery thereof, with the side and corner portions of the spring inclined in one generally axial direction, said side portions merging tangentially into the corner portions, and said spring being free of bends adjacent to said corner portions.

5. A piston ring spring for expanding and causing axial movement of a piston ring, including a strip of resilient material of polygonal form, said spring having curved corner portions inclined to the axis of the spring, the corner portions merging into the side portions, and the latter being inclined to the axis of the spring with the merging of the side and corner portions being tangential at all points.

6. A piston ring spring consisting of a generally curved blank of resilient strip material, said spring being of polygonal form, the side and corner portions of the spring being inclined in one generally axial direction, the corner portions being curved, the side and corner portions merging tangentially into each other at all points.

7. A piston ring spring for expanding and causing axial movement of a piston ring, said spring consisting of a strip of resilient material of polygonal form, the corner and side portions of the spring being inclined in like direction to the axis of the spring, the corner portions of the spring being curved, the side portions merging tangentially into the corner portions, the side portions having their lower edges in the form of arcs terminating adjacent to the corner portions.

8. A piston ring spring of generally polygonal shape and having side portions having relatively straight edges and corner portions having arcuate edges, the corner and the side portions being inclined at a substantially like angle to the axis of the spring, the corner portions being curved about axes extending in the general direction of the axis of the spring, and the side portions merging substantially tangentially into the corner portions.

ANTHONY GUERRIERO.